United States Patent [19]

Harris

[11] Patent Number: 4,950,167

[45] Date of Patent: Aug. 21, 1990

[54] VISUAL DETAIL PERCEPTION TEST KIT AND METHODS OF USE

[75] Inventor: Jeffrey A. Harris, Cherry Hill, N.J.

[73] Assignee: Jewish Employment and Vocational Service, Philadelphia, Pa.

[21] Appl. No.: 423,920

[22] Filed: Oct. 19, 1989

[51] Int. Cl.$^5$ .............................................. G09B 19/00
[52] U.S. Cl. ...................................... 434/322; 434/327
[58] Field of Search ............... 434/322, 327, 331, 333, 434/345, 236, 184; 351/203

[56] References Cited

U.S. PATENT DOCUMENTS

| | | | |
|---|---|---|---|
| 2,628,435 | 2/1953 | Minninger et al. | 434/327 X |
| 3,478,440 | 11/1962 | Ritchie et al. | 434/331 |
| 3,570,145 | 3/1971 | Hickey | 434/184 |
| 4,045,884 | 9/1977 | Zand | 434/184 |
| 4,650,426 | 3/1987 | Brigance | 434/322 |

FOREIGN PATENT DOCUMENTS 703749  12/1963  Canada ................................ 434/331

OTHER PUBLICATIONS

*Teaching Resources Catalog 1982;* pp. 99–100.

*Primary Examiner*—Richard J. Apley
*Assistant Examiner*—Rachel M. Healey
*Attorney, Agent, or Firm*—Caesar, Rivise, Bernstein, Cohen & Pokotilow, Ltd.

[57] ABSTRACT

A test kit and method of use. The kit comprises at least one indicia bearing test sheet, at least one associated, indicia-bearing, instruction sheet, one indicia-bearing marker for the test sheet, and a binder for the sheets. The test sheet bears indicia forming one target icon and a plurality of answer icons. One of the answer icons is identical to the target icon, and the others of the answer icons are similar to the target icon yet somewhat different in appearance. The answer icons are located at predetermined locations on the test sheet. The marker comprises a transparent member bearing indicia corresponding exactly to the target icon. The instruction sheet bears plural respective instructional text at locations corresponding to the locations of the answer icons on the test sheet. Each of the text provides information describing the differences and/or similarities between the target icon and that answer icon which is located in the same respective position on the test sheet. The marker is arranged to be placed on the target icon and the correct answer icon by the test giver so that they can be seen therethrough to show their identity. The marker, when placed on any incorrect answer icon, enables the person taking the test to readily see the differences therebetween. The test giver orally comments on the answer icon selected by the person taking the test in accordance with that instructional text on the instruction sheet which is associated with the selected answer icon.

13 Claims, 2 Drawing Sheets

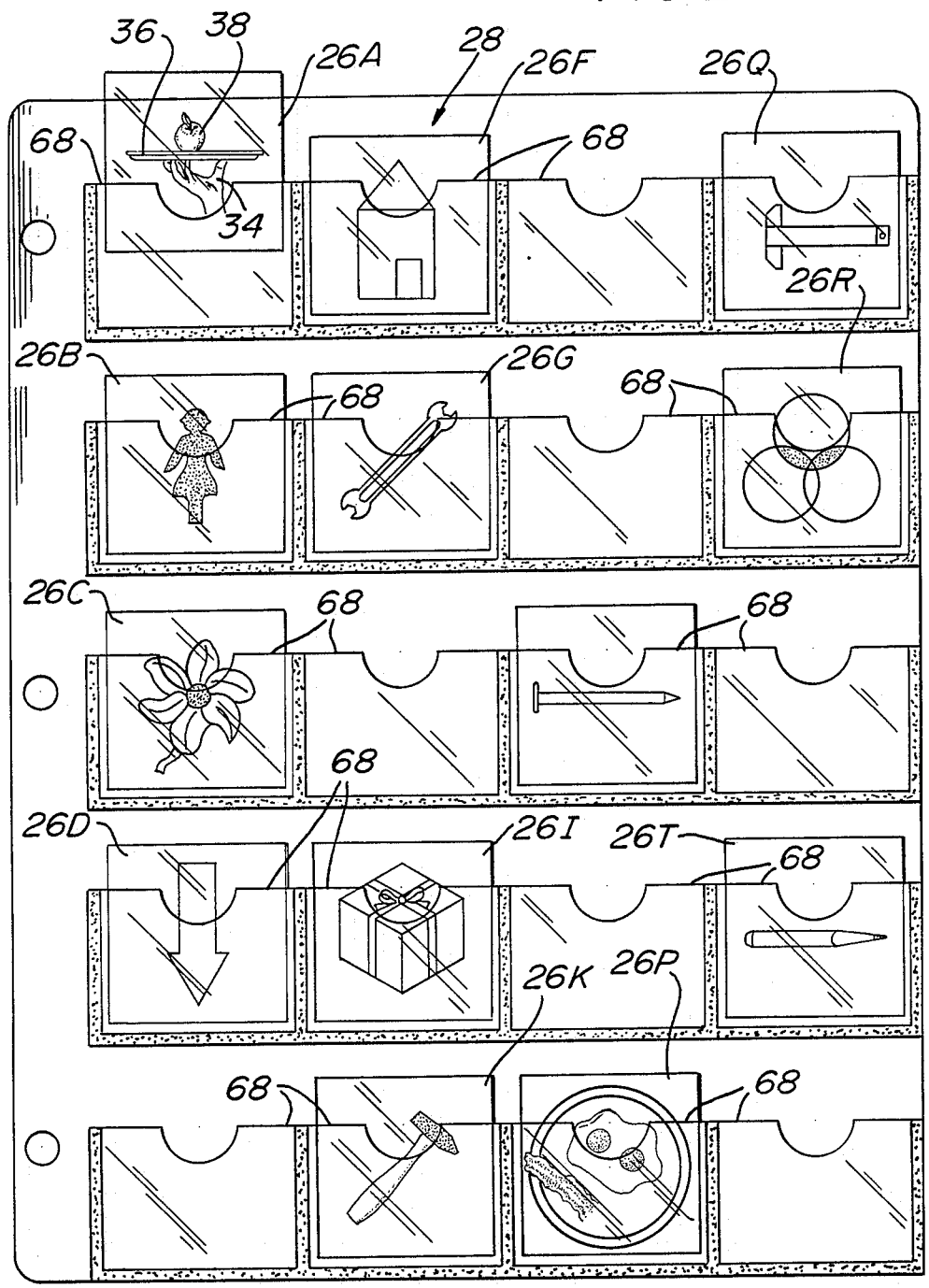

VISUAL DETAIL PERCEPTION TEST KIT AND METHODS OF USE

BACKGROUND OF THE INVENTION

This invention relates generally to devices and methods of use for testing individuals, and more particularly to test kits and methods of use to effect the testing of visual perception of persons.

Existing approaches to the assessment of visual perception of persons typically emphasize a static testing method in which multiple choice picture matching test items are administered after oral or written test-taking instructions are given. Typically, such tests are preceded by preliminary instructions like the following: "This is a test to see how well you can match pictures. On each test item, a target is shown and four possible answers are presented. You must select the choice that is exactly the same as the target. When you look for the answer that matches the target you should always make sure that your answer is the same size as the target, is colored just like the target, has all the same parts as the target, and that your answer is the same shape as the target. Also, remember that the correct answer may show the picture in a different position or facing a different direction. As long as the picture is otherwise the same as the target, it is the correct answer." Such tests are terminated after a predetermined amount of time and then the number of correct answers is compared to available normative findings (percentile rank).

Although the preceding approach is quite straightforward, when applied in non-impaired populations, it is less clear that such a methodology is appropriate among the cognitively disabled and/or impaired. In fact, it should be apparent that the preceding methodology is only straightforward if the test taker's vocabulary includes all the words and concepts used, if his/her memory capacity is adequate for purposes of encoding, retaining, and recalling the totality of the instructions, and if he/she can imagine that a rotated picture can match a target stimulus (picture).

Given that developmentally disabled and brain injured person oftentimes present limited/impaired memory, limited/impaired receptive language functions, and limited/impaired capacities for abstract thought and problem solving, one cannot assume that written or oral test instructions are adequate preparation for valid test administration. In fact, it is widely recognized that simpler and more concrete methods are most appropriate for such individuals.

Just as traditional methods of test instruction delivery are inadequate and invalid for the cognitively impaired/disabled, there is, similarly, reason to suspect that cognitive impairments and disabilities, essentially unrelated to perceptual/sensory capacities, undermine optimal performance during the assessment process. Although the process of identifying an answer alternative that matches a visual target appears to be quite straightforward, research and theory strongly suggest that the capacity to impose an appropriate strategy for surveying the possible alternatives and in selecting a particular answer is critical. This is a particularly acute problem among the developmentally disabled and brain injured.

The need thus exists for test materials and methods of use which overcome the disadvantages of the prior art.

OBJECTS OF THE INVENTION

Accordingly, it is a general object of this invention to provide a test kit and method of use which overcomes the disadvantages of the prior art.

It is a further object of this invention to provide a test kit which facilitates the testing of a person's visual perception ability.

It is a further object of this invention to provide a test kit which is simple in construction and easy to use for testing of a person's visual perception ability.

It is a further object of this invention to provide a method of use of test materials which enables the efficient visual perception testing of persons who may be cognitively disabled and/or impaired.

SUMMARY OF THE INVENTION

These and other objects of this invention are achieved by providing a test kit for testing the visual perception of a person. The kit comprises at least one indicia bearing test sheet, at least one associated indicia-bearing instruction sheet, one indicia-bearing marker for the test sheet, and holding means for the test and instruction sheets. The test sheet bears indicia forming one target icon and a plurality of answer icons, one of the answer icons being identical to said target icon, the others of the answer icons being similar to said target icon yet differing somewhat in appearance. The answer icons are located at predetermined locations on the test sheet.

The marker comprises a transparent member bearing indicia corresponding exactly to said target icon and arranged to be placed on the target icon so that the target icon can be seen therethrough to show the identity of those indicia. The marker can also be placed on the one (correct) answer icon on said test sheet so that it can be seen therethrough to show the identity of those two indicia, and on any of said other answer icons so that they can be seen therethrough to show the non-identity thereof.

The instruction sheet bears respective instructional indicia in locations corresponding to the locations of the answer icons on the test sheet. The holding means is arranged for holding the test sheet in front of the person being tested so that said icons are right side up as viewed by him/her. With the holding means so arranged the instruction sheet is held so that the indicia thereon appears right side up in front of the person giving the test and upside down to the person taking the test. Each of the respective instructional indicia provide information to the person giving the test about the differences and/or similarities between the target icon and that answer icon which is located in the same respective position on the test sheet as the respective instructional indicia so that the person giving the test can readily point out the differences and/or similarities to the person taking the test.

The method of use of the kit entails placing the test sheet in front of the person being tested so that the icons appear right side up to the person taking the test, and placing the instruction sheet in front of the person giving the test so that the instructional indicia appears right side up to the person giving the test and upside down to the person taking the test. The person taking the test then selects the answer icon he/she deems identical to the target icon. Thereafter the marker is placed adjacent the target icon on the test sheet to show the identity of the icons. The marker is also placed on the answer icon selected by the person taking the test so that the selected answer icon can be seen therethrough to show the identity and/or differences therebetween. The person giving the test then orally comments on the identity and/or differences in the icons in accordance with the instructional indicia on the instruction sheet which is at the location corresponding to the selected answer icon on the test sheet.

DESCRIPTION OF THE DRAWINGS

Other objects and many attendant features of this invention will become readily appreciated as the same becomes better understood by reference to the following detailed description when considered in connection with the accompanying drawings wherein:

FIG. 2 is a plan view of another portion of the test kit shown in FIG. 1.

DETAILED DESCRIPTION OF THE PREFERRED EMBODIMENTS

Figure 1:
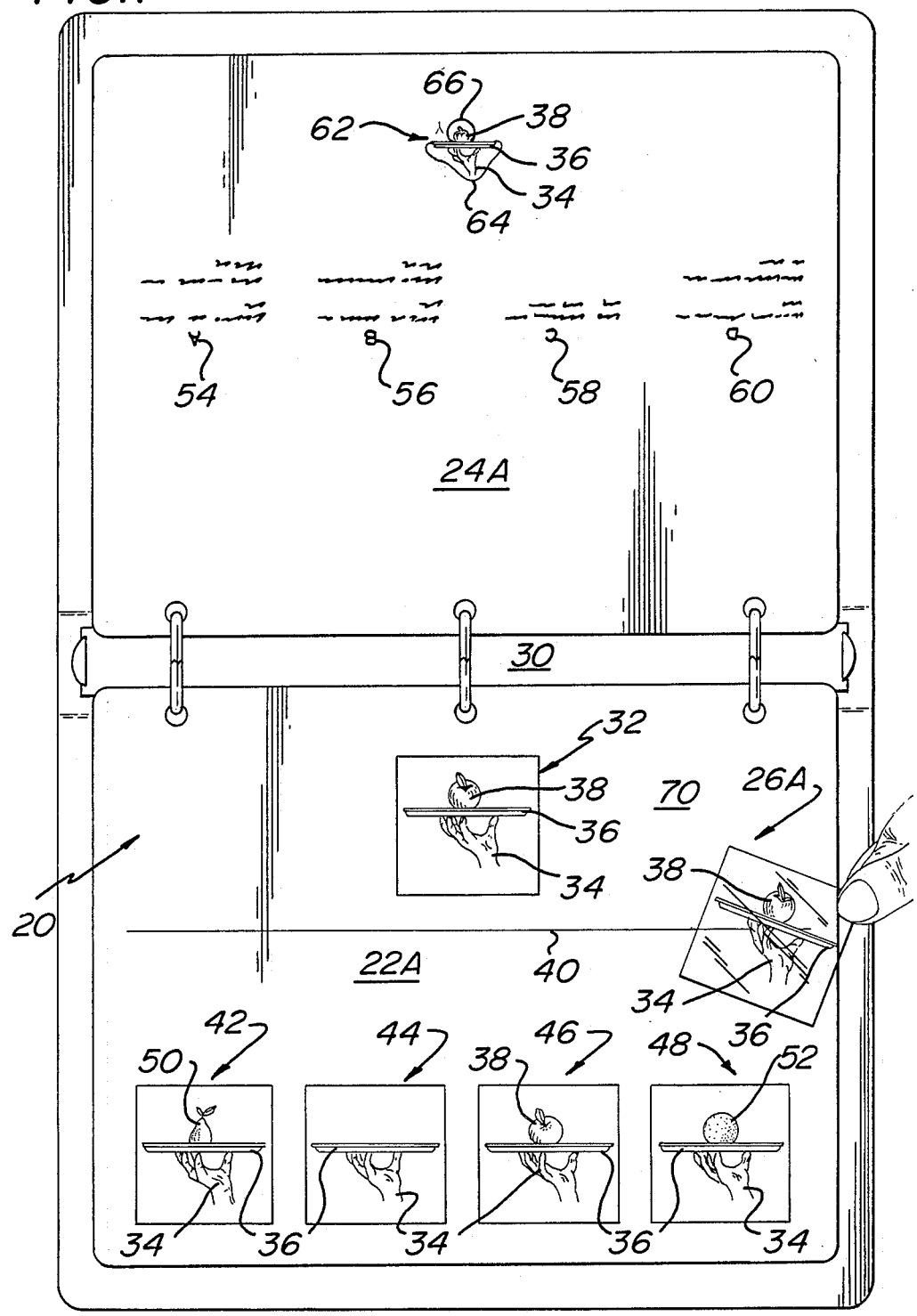
FIG. 1 is a top elevational view of the test kit of this invention shown in typical use in the conduct of a visual perception test on an individual.

Referring, now to various figures of the drawing where like reference numerals refer to like parts there is shown at 20 in FIG. 1 a kit for testing the visual perception of an individual (the evaluee).

The kit basically comprises a plurality of test sheets 22A et seq (only one of which, 22A, is shown herein), a plurality of instruction sheets 24A et seq (only one of which, 24A, is shown herein), a plurality of transparent indicia bearing markers 26A et seq (several being shown in FIG. 2), a pocketed holder 28 (FIG. 2) for the markers 26, and a conventional three ring binder 30 for holding the test sheets 22A et seq, instruction sheets 24A et seq and the marker holder 28.

In the drawing herein only one test sheet 22A can be seen. The other test sheets 22 of the kit are similar in structure to the visible sheet but differ therefrom by the indicia printed thereon since each test sheet represents what can be thought of as a different question in a test series. Each of the test sheets 22A et seq is in the form of a multiple choice format. To that end the evaluee is presented with a test sheet on which indicia making up a target stimulus is printed. The indicia making up the target stimulus is in the form of an "icon", that, is a drawing of a common object or objects. The drawing may be a line drawing, may be shaded, colored, etc.

In the embodiment shown herein the target icon on the test sheet 22A is designated by the reference numeral 32 and basically comprises a line drawing of a hand 34 holding a tray 36 with an apple 38 on the tray. The target icon 32 is printed on the test sheet at approximately a central location adjacent the top edge (i.e., the portion with the holes for the binder's rings) thereof.

A horizontal line 40 is printed below the icon 32 to serve as a dividing line to separate the target icon from the icons which make up the potential matches therefor. Thus, printed below the line 40 are indicia making up four "answer" icons 42, 44, 46 and 48. Each of the icons 42-48 represents a possible answer or match for the target icon 32. In that regard each of the icons 42-48 include similar appearance characteristics, e.g., objects, to the target icon but with some differences, except that one answer icon is identical in all respects to the target icon. That answer icon is the "correct" or "matching" icon. Thus, in the exemplary test sheet 22A shown in FIG. 1 it can be seen that icon 42 includes indicia representing the hand 34 and the tray 36, but not the apple 38. Instead icon 42 includes an additional object, namely a pear 50 drawn on the tray. Icon 44 includes the indicia 34 of the hand and the indicia 36 of the tray, but not the indicia 38 representing the apple. Answer icon 48 includes the indicia 34 representing the hand, the indicia 36 representing the tray and indicia representing an additional object, namely an orange 52, but no indicia representing the apple 36. Thus, it will be immediately recognized that icons 42, 44, and 48 do not match target icon 32 (and are thus representative of wrong or non-matching answers). Since icon 46 includes indicia representing the hand 34, tray 36, and apple 38 and nothing else, and thus matches target icon 32, icon 46 represents the correct or matching answer for the visual test "question" presented by the test sheet 22A As can be seen in FIG. 1 the test sheets 22A et seq are held within the binder 30 like pages of a book so that the test sheet which is then on the top, e.g., 22A, can be viewed readily by the evaluee. To achieve that end the binder with the sheets therein is placed in front of the evaluee and oriented so that the test sheet's indicia appears right side up to the evaluee. With the binder so disposed the underside surface of the previous test sheet is disposed away from the evaluee and toward the evaluator. In accordance with a preferred embodiment of this invention the underside surface of one test sheet forms the instruction sheet for another test sheet. Thus, the underside surface of the test sheet prior to 22A forms the instruction sheet 24A of test sheet 22A.

The instruction sheet 24A like the other instruction sheets (not shown) includes text indicia printed at four positions on the test sheet. Those positions correspond to the positions of the answer icons, e.g., 42, 44, 46, and 48, of the corresponding test sheet, e.g., test sheet 22A. The instruction indicia are printed on the sheet so that when the instruction sheet is in the position shown in FIG. 1, with the person giving the test facing the instruction sheet so that he/she can read the text on the instruction sheet, the evaluee will not be able to since the instructional text will appear upside down to the evaluee.

In the exemplary embodiment of instruction sheet 24A shown herein the text at the position 54 designated "A" (which corresponds to the location of the answer icon 42) states: "(Point to X) This part is the same. (Point to Y) This part is not the same." The instructional text at location 56 designated "B" (which corresponds to the location of the answer icon 44) states: "(Point to X) This part is the same. (Point to Y) This part is not the same." The instructional text at location 58 designated "C" (which corresponds to the location of answer icon 46) states: "(Point to X and Y) These parts are the same." The instructional text at location 60 designated "D" (which corresponds to answer icon 48) states: "(Point to X) This part is the same. (Point to Y) This part is not the same."

The textual instructions at locations 54-60 constitute what may be deemed a "script" of comments and gestures that the test giver is to state/perform with respect to portions X and Y of the target icon and answer icon in response to the "answer" selected by the evaluee, as will be described in detail later. Thus, the instruction sheet includes indicia 62 thereon representing the target icon 32, but smaller in size and including portions circled thereabout bearing the designations "X" and "Y". In the exemplary embodiment of the instruction sheet 24 shown herein the portion of the icon of the hand 34 and plate 36 is encircled by a printed line 64 representing the "X" portion of the icon, while the apple portion 38 of the target icon is encircled by a line 66 representing the "Y" portion thereof.

As also mentioned earlier, the kit 20 includes plural markers 26A et seq. The markers 26A et seq are each of the size of the periphery of the target icon, e.g., two inches square, and each marker has printed thereon a respective target icon for an associated test sheet and instruction sheet. Thus, the marker 26A for the test sheet 22A has printed thereon indicia identical in all respects to the indicia of objects 34, 36 and 38 making up the target icon 32.

Each marker is preferably formed of a thin, transparent material, e.g., plastic, so that it can be placed on portions of the test sheet to enable various icons on the test sheet to be seen therethrough, as will be described later.

As shown in FIG. 2 the markers 26A et seq are preferably stored in individual pockets 68 in the holding means 28 (which is in turn stored in the binder 30) so that they may be extracted therefrom as needed, e.g., as each test sheet is used, and then returned for storage.

The test kit 20 and method of use is preferably preceded by two preliminary instructional phases which form no part of this invention and are specifically designed to first teach the evaluee to select the alternative that is identical to a stimulus target. The evaluee achieves task-objective mastery when he/she identifies the alternative that matches four different target stimuli, first using plexiglass targets of various shapes, e.g., circle, square, triangle, rectangle, etc. and then corresponding line drawings of the shapes.

Once the evaluee has reached mastery in such phases, he or she moves into the test orientation instructional phase, during which the subject kit is used. The kit and its manner of use has been designed to facilitate conveyance of test-taking instructions that pertain t critical test item attributes/parameters that must be considered in answer selection. As will be discussed hereinafter, the manipulative materials of the kit and the test sheets and instruction sheets have been designed to minimize the importance of receptive language skills during both instruction and testing, to provide feedback concerning the correctness of selected answers during instruction and testing, and in order to model strategies for breaking a graphic whole, i.e., a picture or icon, into subcomponents or elements, such as the elements or components 34, 36 and 38 discussed heretofore.

Typically, the testing methodology of this invention is preceded by preliminary oral or written instructions such as the following: "This is a test to see how well you can match pictures. On each test item, a target will be presented at the top of the page and four choices will be presented below a solid black line. You must point to the alternative that is exactly the same as the target. When you look for the answer that matches the target, you should always make sure that your answer is the same size as the target, is colored just like the target, has all the same parts as the target, and that your answer is the same shape as the target. Also remember that sometimes the correct answer may show the picture in a different position. As long as the picture is otherwise the same as the target, it is the correct answer."

Once the evaluee has demonstrated mastery of the multiple choice answer procedure, he/she proceeds to what is referred to as the test orientation phase wherein the examiner presents test sheet 22A and asks the evaluee to point to the answer alternative (icon) that is exactly the same as the target stimulus (icon). Once the evaluee selects his/her answer, the examiner presents the marker 26A (which corresponds to the target and correct answer) and then places it on the sheet 22A at location 70 alongside the target icon. The examiner then states "These pictures are exactly the same. Let me show you.". The examiner then moves the transparent marker 26A on top of the target icon and aligns all the features until there is only one image. The examiner then says: "The pictures are exactly the same. Now, lets check your answer.". The examiner then slides the marker down the test page and over the evaluee's selected answer icon to align as many of the features (objects) of the icon as possible. If the evaluee has selected the correct answer, all icon features can be readily aligned and there will only be one image visible. Conversely, if the evaluee has selected an incorrect answer, when the examiner slides the transparency down the page over the answer selected and aligns as many corresponding features as possible there will still be some features that do not match. Once this has been accomplished the evaluator then slides the transparency immediately above the selected answer and provides verbal and gestural feedback concerning features that match and/or mismatch as instructed by the text indicia on the instruction sheet 24A. To that end specific instructions for the test giver, regarding precise verbal statements and appropriate gestures for each of the possible response alternatives are found in locations A-D on the instruction sheet and which locations correspond to the various selected answers. For example, if the evaluee has selected the correct answer icon the evaluator reading from the text at location 58 states: "These parts are the same" as he/she points first to portion X and then to portion Y of the icon to demonstrate the fact that the X portion 64 of the target icon matches the X portion of the answer icon and that the Y portion 66 of the target icon matches the Y portion of the answer icon.

In accordance with a preferred aspect of this invention the gestures and verbal statements defined by the text indicia at locations 54-60 on the instruction sheet 24A (and each other instruction sheet), focus upon identical stimulus attributes/parameters for each of the respective response alternatives (answers). Thus, verbal/-gestural feedback by the evaluator is consistent and standardized despite variability in selected answers.

Various exemplary target icons used in the kit 20 are shown on some of the markers visible in FIG. 2. Such icons are merely exemplary and any other icons can be used or selected. The associated instructional text for the icons is structured so that oral statements and coordinated gestures for the various icons are designed to draw attention to all of the types of stimulus attribute/-parameters, e.g., size, shape, shading, rotation, etc., that are implicated in the icons to be encountered during the testing procedures. Similarly when the marker is best aligned with an evaluee's incorrect response, the perceptual mismatch may be autonomously noted by the examinee. When the marker is subsequently aligned with the correct alternative, that is the correct answer icon, and then moved above that icon, oral/gestural feedback establishes the requisite parameters/attributes that define "correctness".

It should thus be appreciated that the test orientation instructional transparency (marker) intervention taken as whole, simultaneously offers perceptual/verbal/gestural feedback regarding answer accuracy while also providing information concerning critical attributes/parameters that define correct response behavior.

In a preferred embodiment of the invention there are ten "test orientation items", that is ten target icons to be matched. Once the evaluee has attempted each of the ten test orientation items, the evaluee begins a formal test phase designated as phase I. In that phase items like those presented during the test orientation phase are presented, but feedback is not provided by the evaluator during this process. During this phase, then, the evaluee works independently until his/her performance erodes to what is commonly referred to as "chance level of performance", that is, less than eight correct responses in a block of twenty (20) consecutive test items.

Within a non-impaired population, one would normally assume that the evaluee's performance erodes to the chance level on successively more difficult items due to the attainment of what is known as one's "performance ceiling". Within cognitively disabled or impaired populations, however, numerous alternative explanations can be offered for progressive decrement in response accuracy rates on successively more difficult items. These possibilities include fatigue, lack of attention, difficulties in recalling critical attribute/parameters to attend to, forgetting the general task objective, and/or limited ability to impose an effective strategy in answer selection. These types of possibly confounding variables, unrelated to visual perception capacities per se, must therefore be minimized if the evaluation process is to yield a valid measurement of the individual's perceptual competence. In essence, interventions must be provided so as to compensate for cognitive disability that may adversely affect response accuracy. During two formal test phases, designated as phases II and III, to be described later, and which are also referred to as the "dynamic intervention phase" and the "preresponse intervention phase", respectively, interventions are introduced so as to minimize the likelihood that such confounding factors are masking underlying proficiencies. The precise nature of these interventions are detailed below, with their corresponding rationales.

The following constitutes the dynamic intervention strategy in the formal test phase II. In this connection, once the evaluee's phase I performance erodes to chance level, flip-chart and test orientation instruction phases are readministered to insure that the examinee still understands the general task objectives. The evaluator then goes back twenty test items from the terminus of phase I. As an example, if phase I was terminated at test item forty-four, the evaluator would return to item 25 and would present that item after administration of the test orientation instruction phase. As in phase I the examinee selects his/her answer. In phase II, however, the evaluator presents the marker (transparency) that corresponds to the correct answer on the twenty fifth test sheet and states that "This picture is exactly the same as the one (pointing to the target). Take this picture and place it on the top of that one (pointing to the target) to see if they are exactly the same.". Once the evaluee has aligned the marker with the target icon and only one image appears, the evaluator then states "See, they are exactly the same. Now, move the plastic picture down to your answer and see if they are the same.". Once the evaluee has achieved his/her best possible alignment, that is either identity of the marker icon and the correct answer icon, or the best possible alignment of the marker icon with the incorrect answer icon, the evaluator pauses and then asks the evaluee to move the marker above the selected answer. The evaluator then provides the verbal and gestural feed-back that corresponds to the item number and alternative, as established by the instructional text indicia appearing at the corresponding location on the instruction sheet It must be noted that though this intervention is similar to the procedure employed during the test orientation phase, there are several significant differences warranting comment. First, and foremost, the examinee performs all of the marker manipulations during the dynamic intervention phase. The active involvement of the evaluee is critical for several reasons, namely, the only way the examinee can successfully establish a single image at a desired position is if the examinee is attending to details of the target and a marker, and similarly the only way the evaluee can establish the best possible perceptual correspondence between the marker and the selected answer is if the evaluee is attending to the details of the target and the marker. Thus, active involvement of the evaluee increases the likelihood that attention is devoted to the task and, similarly, increases the likelihood that the evaluee will independently detect mismatches in details when incorrect answers are selected. The real significant characteristic over this intervention focuses upon "modeling" and answer selection/checking strategy via verbal and gestural feedback procedures that demonstrate breaking the icon into subcomponents or elements. More specifically, each time the evaluee selects the response, whether correct or incorrect he/she receives verbal and gestural feedback emphasizing breaking or analyzing the whole icon into smaller elements. The repetition of this intervention structure on successive items enhances the likelihood that the evaluee will independently adopt such a strategy. Similarly, recurring verbal and gestural feedback minimizes the negative impact of restricted recall capacity since these verbal gestural cues are reminders to attend to the full range of possible attribute/parameters indicated in the test items.

In summary, then, the phase II interventions facilitate expression of underlying perceptual proficiency by providing a cognitive assist or "crutch" that compensates for restricted problem solving capabilities and limited memory capacity, while keeping the evaluee on task and maximizing the likelihood that the evaluee will independently attend to and assimilate visual/perceptual feedback on response accuracy.

Formal phase III testing then commences. In this connection, once the evaluee's phase II performance erodes to chance level, the flip-chart instructional phase is once again repeated to insure that the examinee still understands the general task objectives. The evaluator then readministers all items answered incorrectly during the last block of twenty items administered during phase II. Unlike the procedures in test orientation, formal test phase I, or formal test phase II, answer selection is preceded by a marker (transparency) intervention. During phase III then, the evaluator flips backward to the first item answered incorrectly during the last block of twenty phase II items and he/she presents the marker that corresponds to the target and correct answer. The evaluator then says "The plastic picture (pointing) is exactly the same as this one (pointing to the target). Take the plastic picture and check to see if it is exactly the same as this one (pointing to the target)".

Once the examinee has established alignment of the marker with the target so as to form one coinciding image, the examiner slides the marker along side the target and provides verbal and gestural feedback cues that correspond to the correct answer as instructed by the associated instructional text on the instruction sheet.

The evaluee is then asked to point to the alternative that is exactly the same as the target icon. In this procedure, then the examinee is no longer expected to transfer learning from one item to the next; a prior alignment. Then coordinated verbal and gestural cues attempt to focus attention on the item attributes/parameters of significance in the particular item at hand. This pre-response intervention, in contrast to the phase II methodology, further reduces the importance of recall of testtaking instructions, i.e., critical stimulus attributes/parameters to attend to, and again "models" a method for breaking the figural whole, that is the entire icon, into subcomponents or elements, and essentially tells the examinee how and what to look for in the answer selection process to follow. Thus, just as phase II dynamic interventions provide greater feedback and structure than afforded during the test orientation instruction phase and formal testing phase I, similarly, phase III interventions further simplify the task by decreasing the role of memory and problem solving capacities.

As should be appreciated from the foregoing, the test kit of the subject invention and the proceeding methodology minimize the importance of receptive language skills during both instruction and testing. In addition it provides feedback concerning the correctness of selected answers during instruction and testing. Thus, the subject invention by emphasizing standardized manipulation of markers, that is transparent overlays, with synchronized and coordinated verbal and gestural feedback in the context of a testing procedure that presents increasingly difficult test items, represents a unique modality for the field of psychometric testing of perceptual proficiency.

Without further elaboration the foregoing will so fully illustrate my invention that others may, by applying current or future knowledge, adopt the same for use under various conditions of service.

I claim:

1. A test kit for testing the visual perception of a person comprising at least one indicia bearing test sheet, at least one associated, indicia-bearing, instruction sheet, one indicia-bearing marker for said one test sheet, and holding means for said test and instruction sheets, said test sheet bearing indicia forming one target icon and a plurality of answer icons, one of said answer icons being identical to said target icon, the others of said answer icons being similar to said target icon yet differing somewhat in appearance therefrom, said answer icons being located at predetermined locations on said test sheet, said holding means being arranged for holding said test sheet in front of the person being tested so that said icons are right side up as viewed by said person, said answer displaying marker comprising a transparent member bearing indicia corresponding exactly to said target icon and arranged to be placed on said target icon on said test sheet so that the target icon can be seen therethrough to show the identity of those indicia, said displaying marker also being arranged to be placed on said one answer icon on said test sheet so that said one answer icon can be seen therethrough to show the identity of those two indicia, and to be placed on any of said other answer icons on said test sheet so that any of said other answer icons can be seen therethrough to show the non-identity of thereof, said instruction sheet bearing respective instructional indicia in locations corresponding to the locations of said answer icons on said test sheet, said holding means also being arranged for holding said instruction sheet so that the indicia thereon appears right side up in front of the person giving the test and upside down to the person taking the test, each of said respective instructional indicia providing information to the person giving the test about the differences and/or similarities between the target icon and that answer icon which is located in the same respective position on the test sheet as the respective instructional indicia so that the person giving the test can readily point out those differences and/or similarities to the person taking the test.

2. The test kit of claim 1 wherein said kit comprises plural test sheets, plural instruction sheets and plural answer displaying markers, each of said markers bearing indicia forming a different icon, each of said markers being associated with one test sheet and one associated instruction sheet.

3. The test kit of claim 2 wherein said holding means holds said plural test and instructions sheets therein so that said sheets can be flipped over by the person giving the test to expose another test sheet.

4. The test kit of claim 4 wherein the instruction sheet associated with the test sheet forms the underside of the immediately preceding test sheet.

5. The test kit of claim 4 wherein said holding means comprises means for releasably securing said test and answer sheets therein.

6. The test kit of claim 5 wherein said holding means comprises a binder.

7. The test kit of claim 6 wherein said binder is a ring binder.

8. The test kit of claim 2 additionally comprising a holder sheet for storing said plural markers therein.

9. The test kit of claim 6 additionally comprising a holder sheet for storing said plural markers therein.

10. A method for testing the visual perception of a person by use of a kit, said kit comprising at least one indicia bearing test sheet, at least one associated, indicia-bearing, instruction sheet, one indicia-bearing marker for said test sheet, said test sheet bearing indicia forming one target icon and a plurality of answer icons, one of said answer icons being identical to said target icon, the others of said answer icons being similar to said target icon yet differing somewhat in appearance therefrom, said answer icons being located at predetermined locations on said test sheet with respect to said target icon, said answer displaying marker comprising a transparent member bearing indicia corresponding exactly to said target icon, said instruction sheet bearing plural respective instructional indicia at locations corresponding to the locations of said answer icons on said test sheet, each of said respective instructional indicia providing information to the person giving the test about the differences and/or similarities between the target icon and that answer icon which is located in the same respective position on the test sheet as the respective instructional indicia, said method comprising placing said test sheet in front of the person being tested so that said icons appear right side up to said person, placing said instruction sheet in front of the person giving the test so that said instructional indicia appears right side up to the person giving the test and upside down to the person taking the test, whereupon said person taking the test selects the answer icon he/she deems identical to the target icon, thereafter said person giving the test places said marker on the target icon on said test sheet so that the target icon can be seen therethrough to show the identity thereto, said person giving the test placing said marker on the answer icon selected by the person taking the test so that the selected answer icon can be seen therethrough to show the identity and/or differences therebetween, and orally commenting on said identity and/or differences in accordance with the instructional indicia on said instruction sheet which is at the location corresponding to the selected answer icon on the test sheet.

11. The method of claim 10 wherein the person giving the test places said marker on said target icon.

12. The method of claim 10 wherein the person giving the test places said marker on said selected answer icon.

13. The method of claim 11 wherein the person giving the test places said marker on said selected answer icon.

* * * * *